Sept. 26, 1950     H. O. SCHJOLIN     2,523,783
TURBODRIVE CONTROL

Original Filed Oct. 16, 1939     8 Sheets-Sheet 1

Hans O. Schjolin, Inventor
By Blackmore, Spencer & Flint
Attorneys

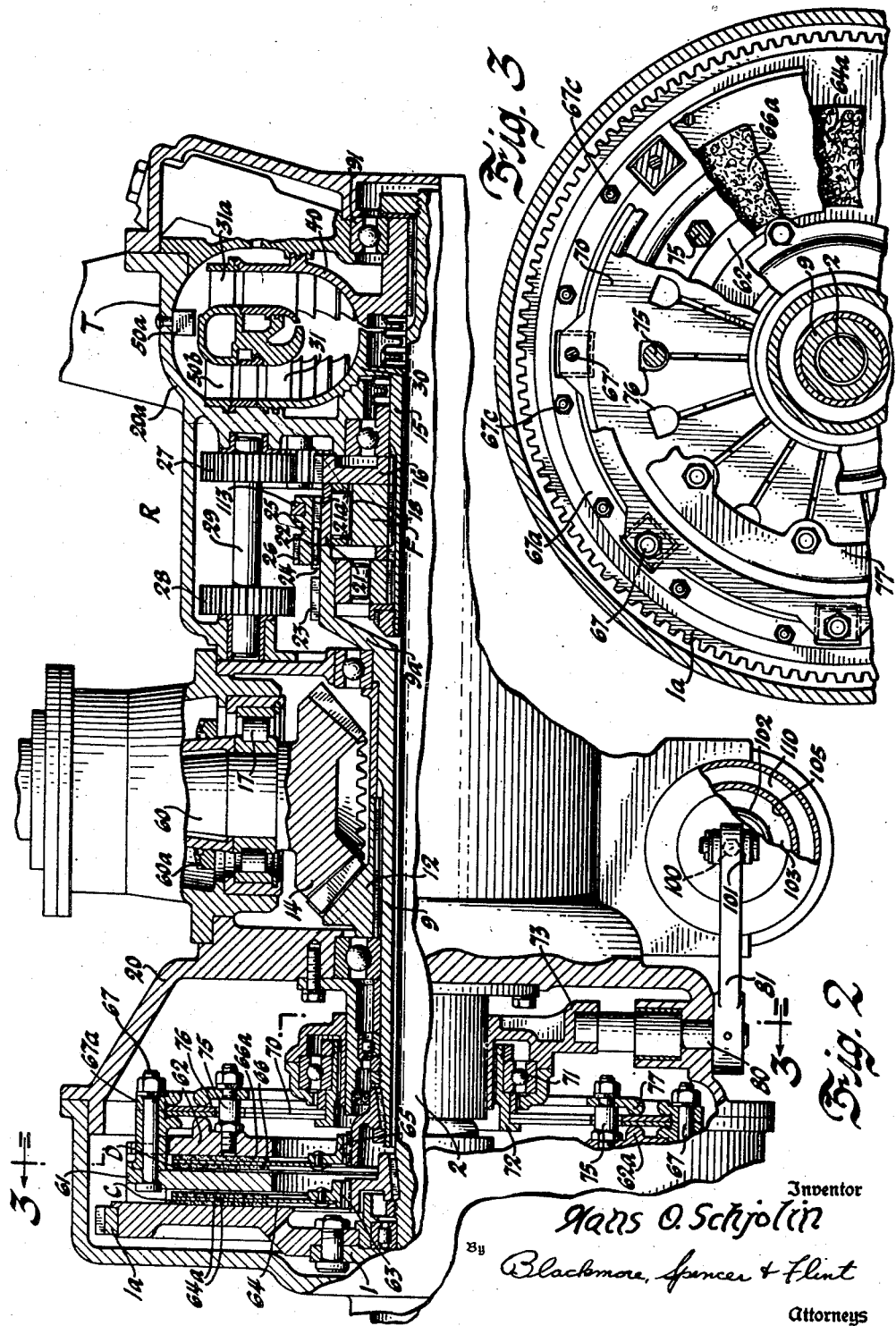

Sept. 26, 1950     H. O. SCHJOLIN     2,523,783
TURBODRIVE CONTROL

Original Filed Oct. 16, 1939     8 Sheets-Sheet 3

Inventor
Hans O. Schjolin
By Blackmore, Spencer & Flint
Attorneys

Sept. 26, 1950     H. O. SCHJOLIN     2,523,783
TURBODRIVE CONTROL
Original Filed Oct. 16, 1939     8 Sheets-Sheet 4
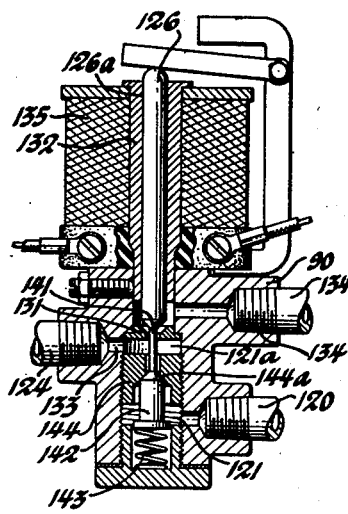
Fig. 8
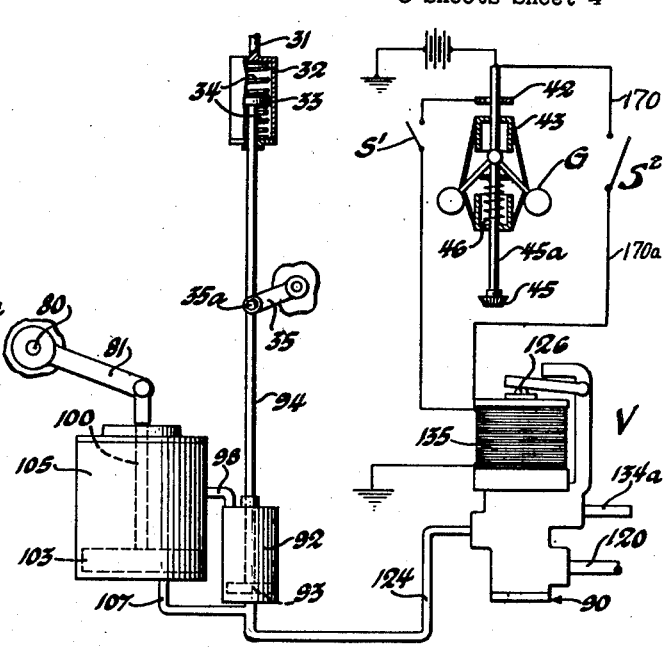
Fig. 9
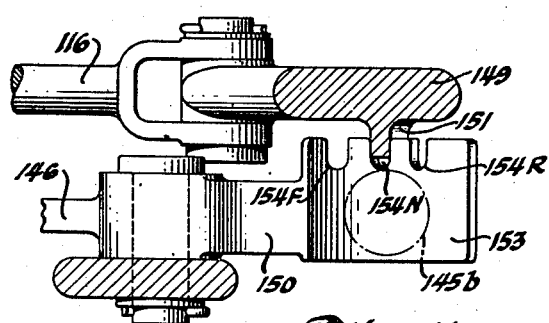
Fig. 11     Fig. 10
Fig. 10 & 11
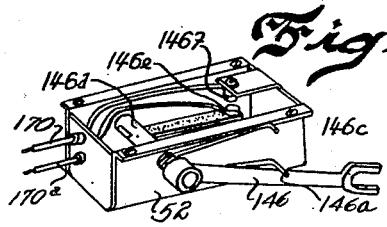
Inventor
Hans O. Schjolin
By Blackmore, Spencer & Flint
Attorneys Hans O. Schjolin, Inventor
By Blackmore, Spencer & Flint
Attorneys Sept. 26, 1950  H. O. SCHJOLIN  2,523,783
TURBODRIVE CONTROL Original Filed Oct. 16, 1939  8 Sheets-Sheet 6

Inventor
Hans O. Schjolin
By Blackmore, Spencer & Flint
Attorneys

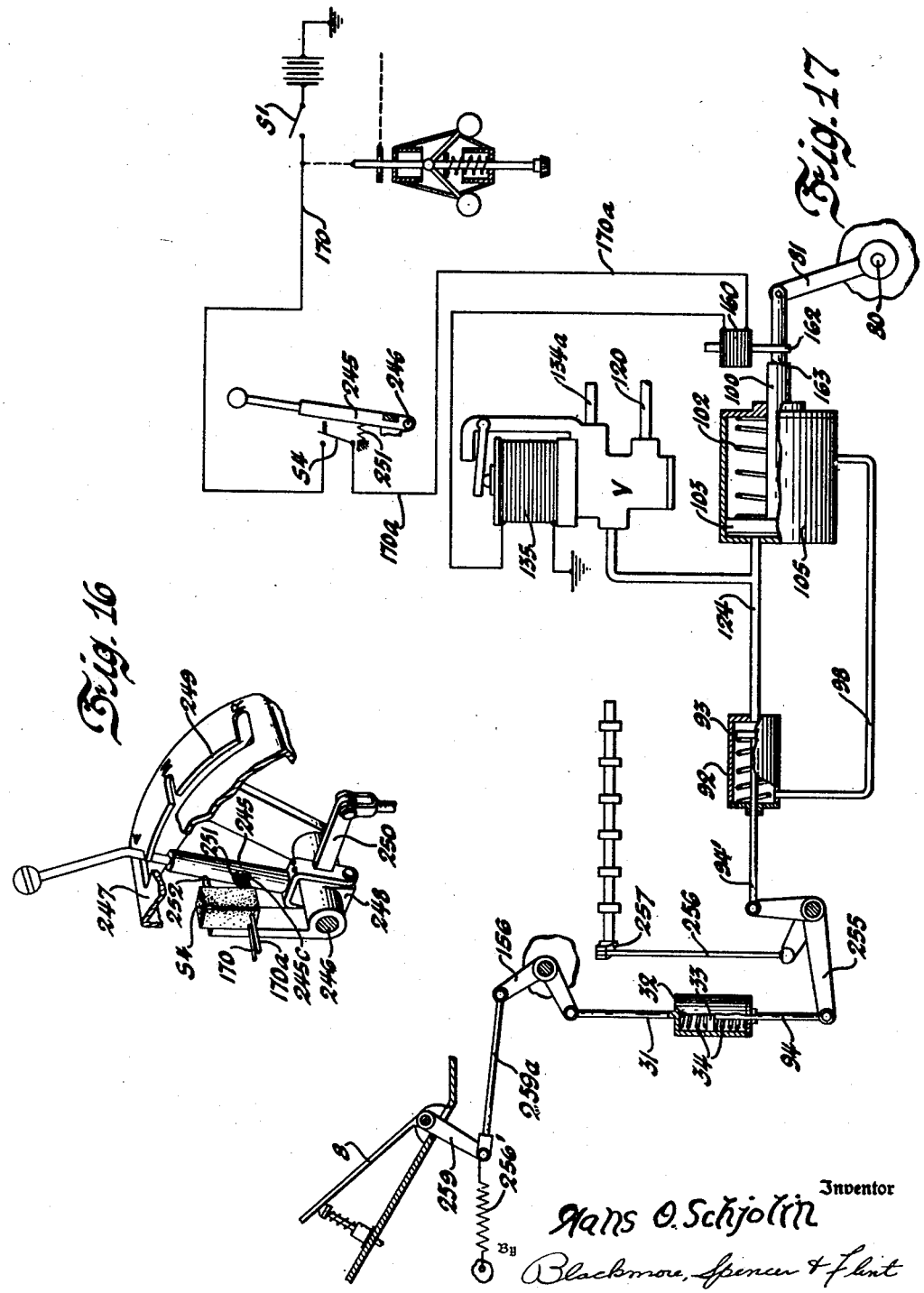

Sept. 26, 1950     H. O. SCHJOLIN     2,523,783
TURBODRIVE CONTROL

Original Filed Oct. 16, 1939     8 Sheets-Sheet 8

Inventor
Hans O. Schjolin
By Blackmore, Spencer & Hunt
Attorneys

Patented Sept. 26, 1950

2,523,783

UNITED STATES PATENT OFFICE 2,523,783

TURBODRIVE CONTROL

Hans O. Schjolin, Birmingham, Mich., assignor, by mesne assignments, to General Motors Corporation, Detroit, Mich., a corporation of Delaware Original application October 16, 1939, Serial No. 299,643, now Patent No. 2,380,677, dated July 31, 1945. Divided and this application May 21, 1943, Serial No. 487,917

14 Claims. (Cl. 74—472)

The invention relates to motor vehicles, more particularly of the type in which the driver's station may be located at some distance from the power plant. It relates specifically to automatic, remotely operated controls for the speed ratio driving mechanism, whereby the vehicle operator retains complete mastery of the mechanism, while permitting certain automatic control functions to be carried on. It relates to interruptive devices whereby the operator may definitely compel forms of operation which would otherwise be self-actuating in the automatic sense; and to force amplifying means for carrying out both automatic and manual control actions, such as is provided by power servo means.

The invention relates to vehicle power plant installations which afford a range of infinitely variable speed ratios for the vehicle drive such as from a fluid torque converter, and alternative direct drive. It further relates to the interlocking of the automatic and manual drive controls in such a way that a minimum of control elements need to be utilized, certain of the control elements having their actions superimposed.

An object of the invention is to provide an auxiliary control of the vehicle engine throttle, effective to expedite the shift interval from infinitely variable speed ratio drive to direct drive, the control being operated by the auxiliary power utilized to actuate the said shaft. An associated object is to provide a throttle restoring action, likewise operated by the auxiliary power shift means.

A further object is to provide an interlocking control between the selector for forward and reverse drive, and the automatically operated mechanism, effective to place the driving means for the direct and the infinitely variable drive in neutral condition prior to a selection by said selector, and to afford therein an auxiliary neutral compelling means for emergency use. The present application is a divisional of my U. S. Serial No. 299,643, filed October 16, 1939 matured as Letters Patent U. S. 2,380,677 on July 31, 1945.

An additional object is to provide a control worked by the engine accelerator pedal effective at beyond full throttle position to actuate the ratio shift mechanism to establish reduction drive by the infinitely variable driving means, while rendering the automatic selection of drive ineffective.

Another object is to provide a single actuating means for the plural speed ratio determining means of the driving mechanism, and subject to the automatic and manual controls above referred to.

The principal object of the invention is to provide an automatically operated, but manually dominated vehicle drive embodying direct and infinitely variable drive means, the controls of which enable the vehicle operator to select the desired operating conditions through relay mechanisms effective to compel drive actuation by unitary auxiliary power means.

An additional object is to provide a dual clutch drive capable of alternate actuation and of alternate loading by a single loading means, and adapted to be operated by the unitary auxiliary power means noted above.

Among the objects is that of providing a manual control to be preset for all forward drive, and operated normally thereafter by automatic ratio selection means except for interruption by manual controls which can compel the actuating means to establish speed ratio control regimes other than automatically chosen, and which can compel drive indefinitely in a given speed ratio range.

In the present example, a drive for a large passenger vehicle is shown, with dual friction clutches loaded by a single loading means effective in one of two positions to establish drive in direct between the vehicle engine and the final drive, and effective in the other position to establish an infinitely variable speed ratio range therebetween. The dual clutches are operated by a single air pressure servo piston and cylinder, the master valve therefor being controlled by electrical circuits, the switches of which are governor, and manually controlled. Auxiliary switches are operated by the engine accelerator pedal, and by the forward-and-reverse gearshift lever, as well as by separate dash control, for purposes to be described herein in full.

The control system herein taught and the ratio actuation means responding to the controls are believed novel, and of utility in the art of vehicle drive operation.

Figure 2 is a longitudinal section of the primary driving assembly taken in a longitudinal plane of Figure 1.

Figure 3 is a section at 3—3 of Figure 2 showing the details of the dual clutch construction thereof.

Figure 8 is a sectional view of the solenoid valve controlling the movement of the structures of Figures 4 to 7 inclusive.

Figure 9 is a schematic diagram of a control system for the structure of Figures 4 to 8, operated by governor G, and adapted to exert a reactive effect upon the engine throttle, but arranged to accomplish this act without interfering with the operator's use of the accelerator pedal, by reason of the lost motion connection in the throttle rodding.

Figure 1:
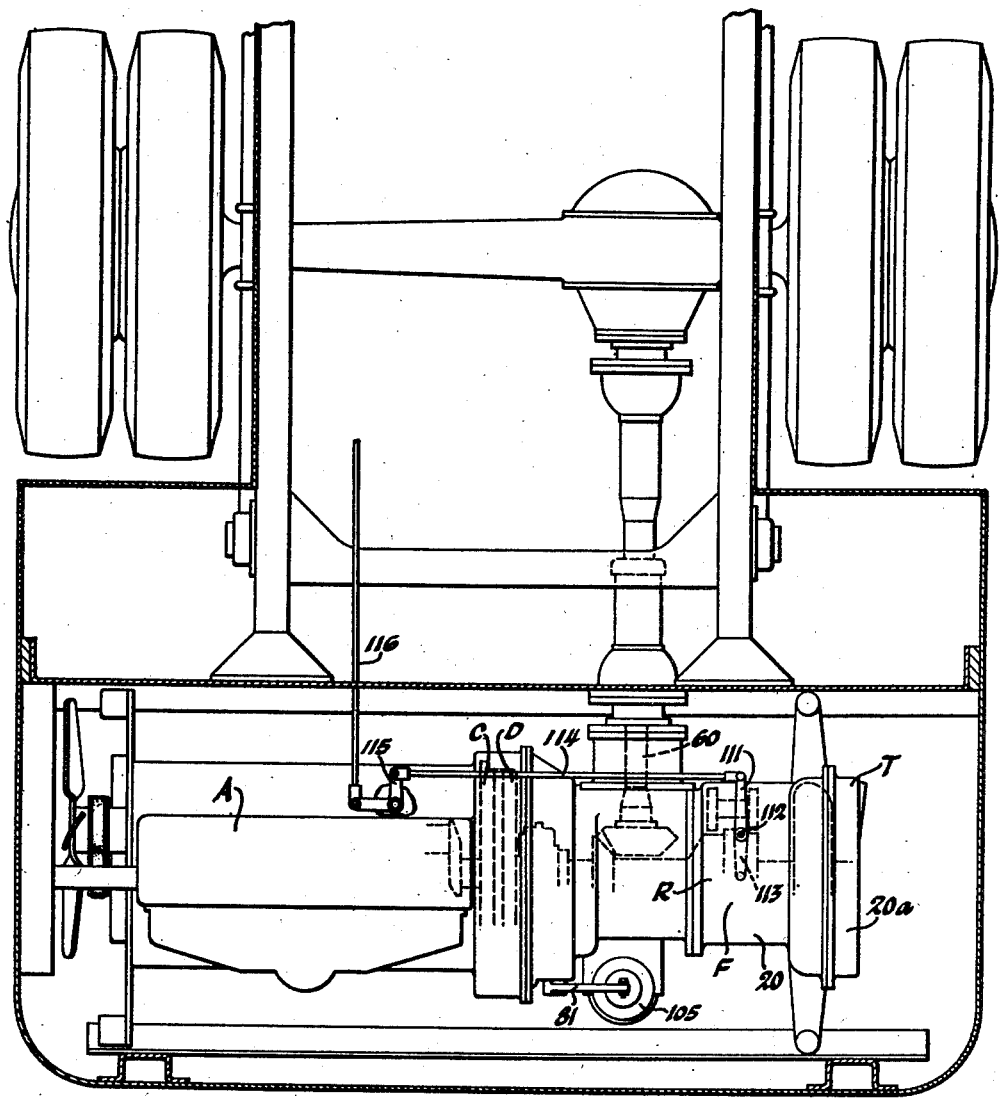
Figure 1 is a schematic view of the invention as applied to a motor bus, with the power plant arranged transversely at the rear, with the operator's control station located at the far end of the vehicle.
Figure 4:
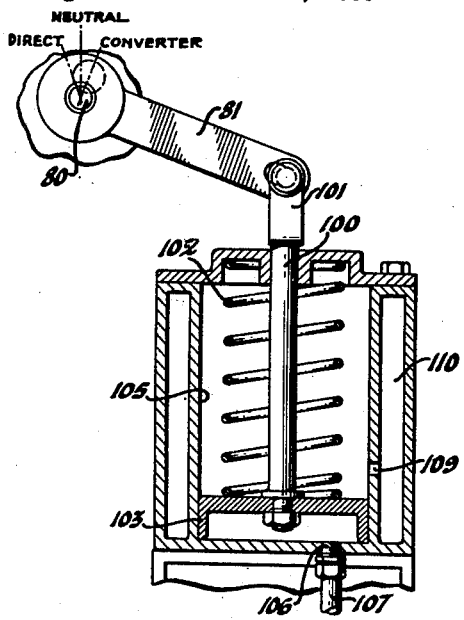
Figure 4 is a sectional view of the servo actuating mechanism of Figure 1, for the actuation of the dual clutch mechanism.

Figure 10 is a vertical view, in part section, of the mechanism in the driver's compartment for controlling the reverse-forward shift rod 116 of Figure 1, and for compelling the mechanism of Figure 4 to shift to, and remain in neutral position. Figure 11 is a sectional view taken on section line 11—11 of Figure 10 showing the means for locking out the motion of the gear-lever of Figure 10. Figure 10a is a partial section of a portion of switch S² shown in Figure 10.

Figure 12:
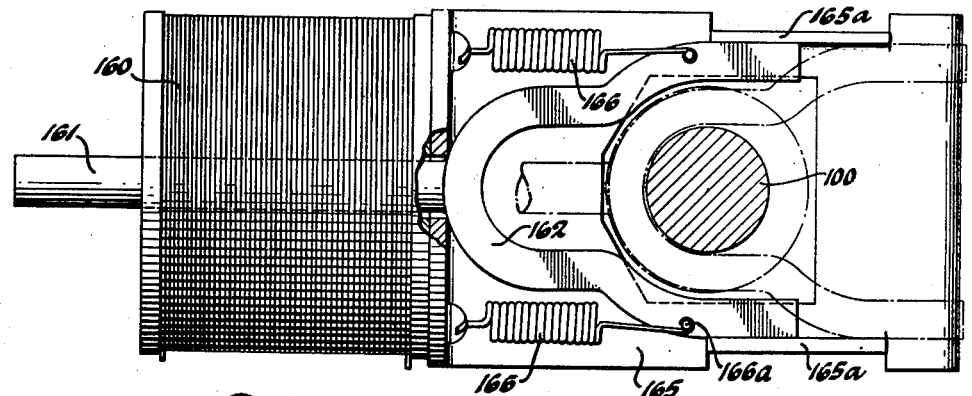
Figure 12A:
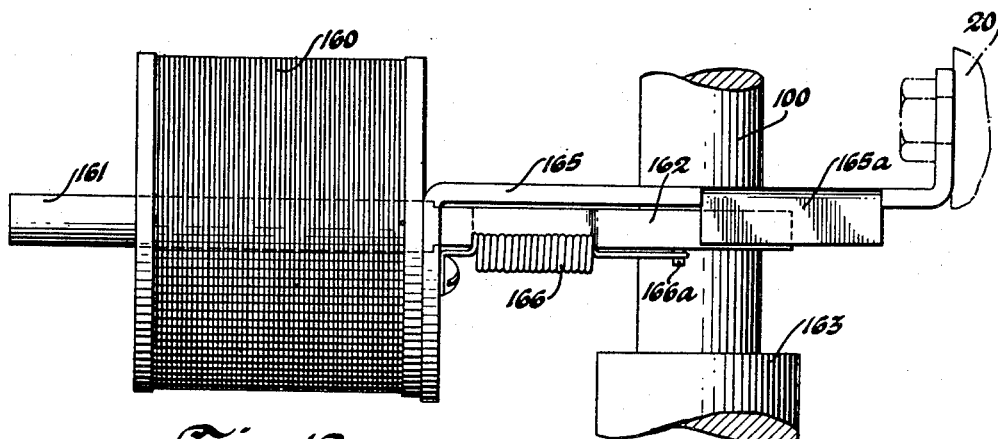
Figure 13:
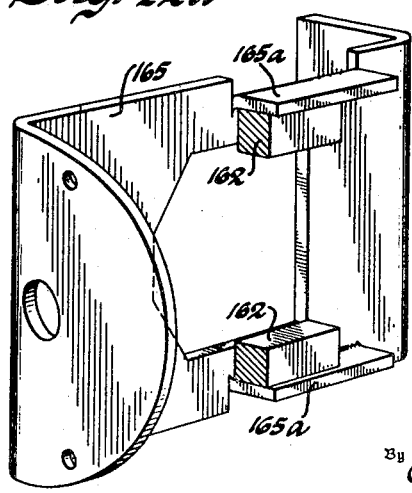

Figures 12 and 12a illustrate the neutral lock means controlled by the structure of Figure 10 in part, for compelling the Figure 4 construction to shift to, and remain in neutral. Figure 13 is a detail of the construction of certain of the parts of Figure 12.

Figure 14:
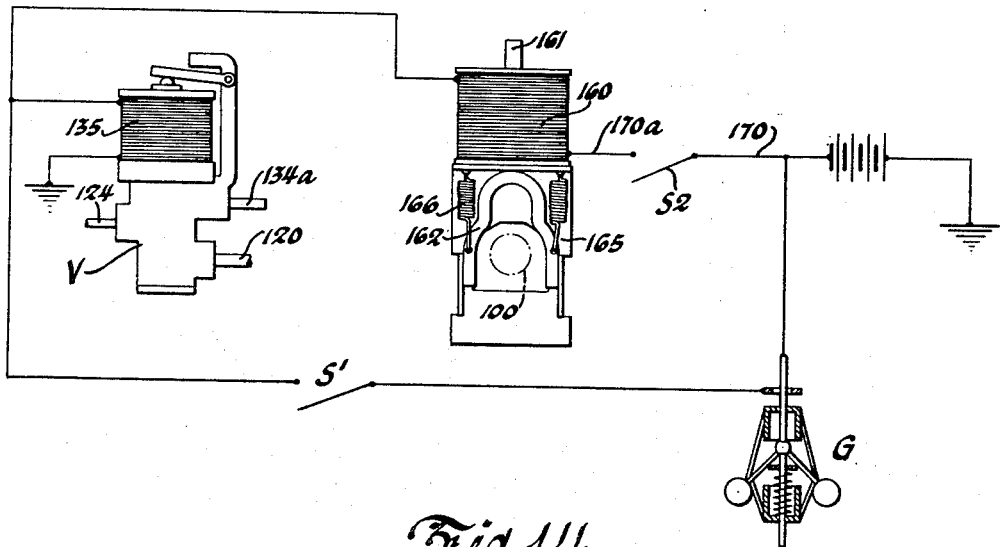

Figure 14 is a schematic control diagram, similar to that of Figure 9, but showing the arrangement of the control elements of Figures 10 to 13, for the neutral shift mechanism above referred to.

Figure 15:
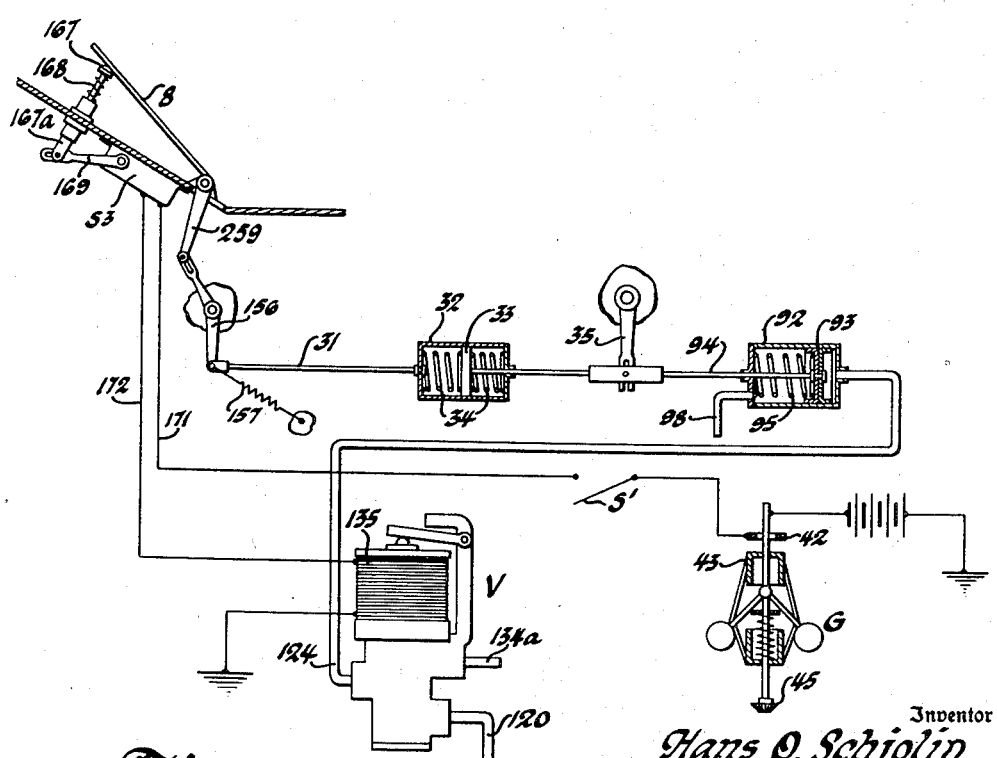

Figure 15 is a further schematic control diagram similar to Figures 9 to 14, but representing a modification in which the operator's accelerator pedal is arranged to compel a downshift from direct to torque converter drive, when the pedal is moved beyond full throttle position.

Figures 16 and 17 are provided to show a specific version of the interlocking controls involving the master selector of drive, manually operated, and the mechanism operated by the driver's accelerator pedal, in determining the drive of the vehicle.

Figure 16 is a perspective view of a forward, neutral and reverse selector arranged to control rodding as shown in Figure 1, and likewise to control a switch directing the energising current for the fluid pressure system actuating the drive of the Figure 2 disclosure through the means described in conjunction with Figures 4 to 9 inclusive.

Figure 17 is a schematic diagram of the control system of the invention as applied to a Diesel-engine-equipped drive. This figure is equivalent to the combination of Figures 14 and 15, but the showing embraces the modification of Figure 16 rather than that of Figure 10, with respect to the manual selector for forward, neutral and reverse.

Figure 17A:
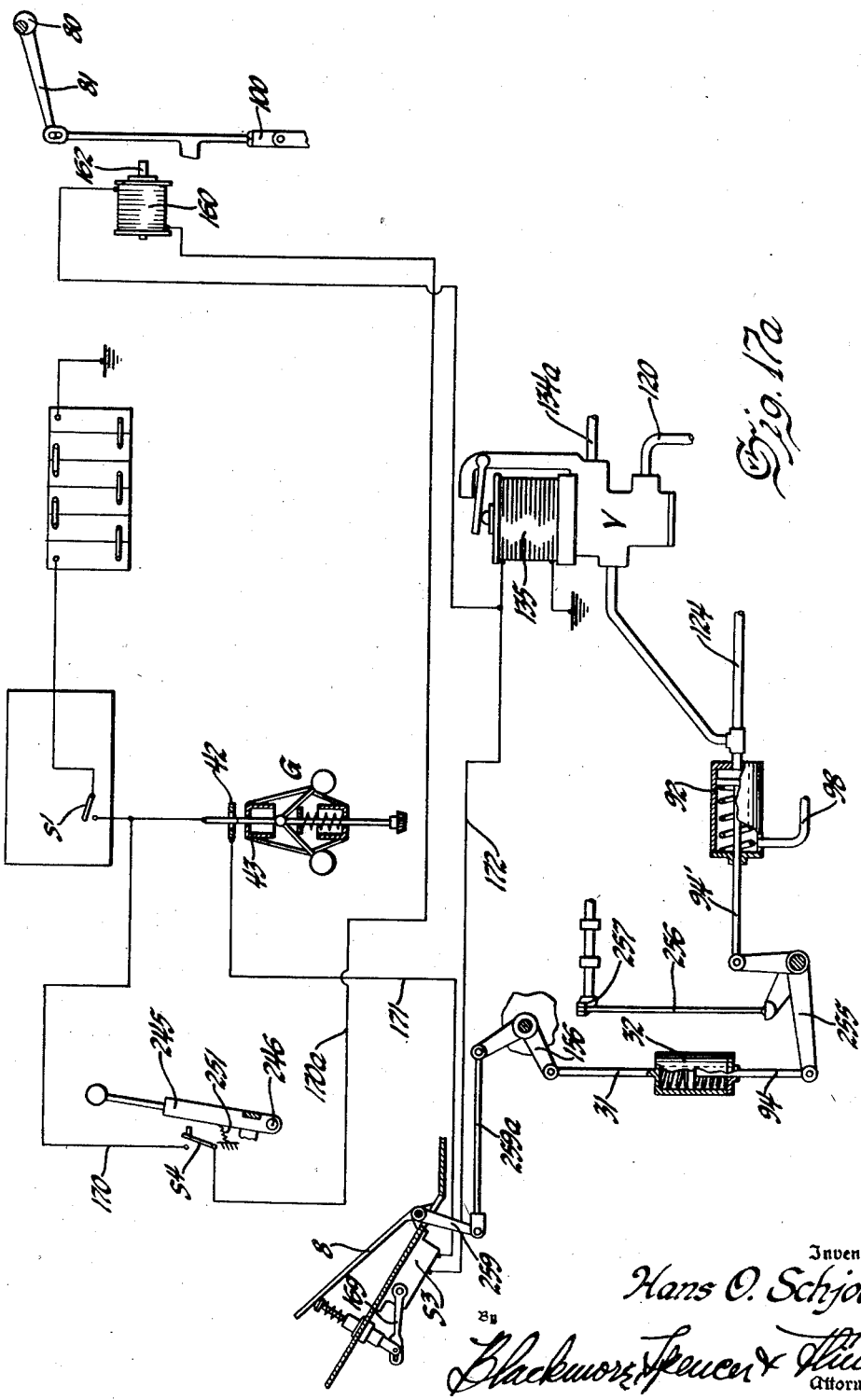

Figure 17a is a schematic diagram of a further modification of a control system.

Figure 5:
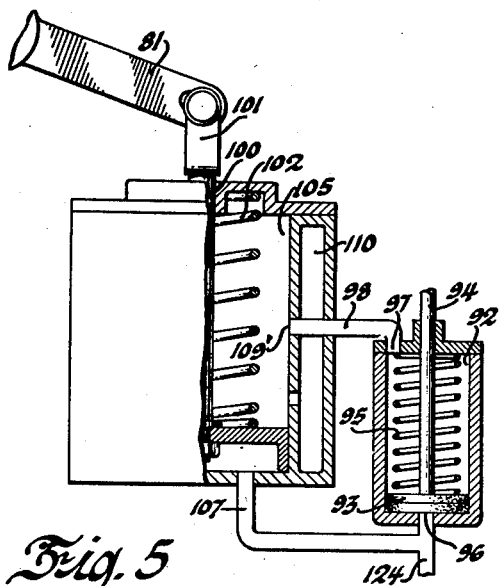
Figures 5, 6 and 7 show the three operation positions of the device of Figure 4, in conjunction with auxiliary throttle control means.

The general construction of the drive arrangement of Figure 2 follows that of Figures 2 and 5 of my United States Serial Number 189,596, filed February 9, 1938, matured February 10, 1942 as U. S. 2,272,434, in which two friction clutches C and D are displaced at either end of the transmission, the first for coupling the torque converter T to the engine, and the other for coupling the engine directly to the final drive.

The applicant filed U. S. S. N. 225,860 on August 20, 1938, for which Serial No. 359,747 was re-filed on October 4, 1937 to replace the preceding abandoned application, the replacement case issuing February 8, 1944 as U. S. 2,341,163. In that patent is shown a rearrangement of the friction clutches C and D, in Figures 6 and 7 thereof, the two friction clutches being grouped together adjacent the engine, with the torque converter T at the far end of the casing, the drive to the vehicle wheels being taken out on the main shaft centerline by right-angle gearing to the final drive shaft 60. This latter arrangement is similar to that of the present demonstration.

The double-clutch construction is particularly arranged so that only one loading system suffices for both clutches, and further, a unitary mechanical linkage operates both clutches. The invention embodies actuation of this linkage, and thereby, the said clutches, from one single servo piston in a single cylinder.

In Figure 1 the drive arrangement is shown as installed in the rear of a passenger bus, the primary power plant arranged transversely and the output drive in the fore-and-aft direction of the vehicle connected by a jackshaft 60 to the conventional differential gear and axle drive to the rear wheels.

The primary power plant comprises an engine A, in the present example of Diesel type, a fluid turbine type of torque converter T used as a variable speed transmission, a clutch C for coupling the turbine to the engine, a clutch D for coupling the engine directly to the final drive; an overrunning device F for disconnecting the turbine from the load shaft, when the clutch D is driving, and a gear assembly R for connecting the forward and reverse drives from neutral.

The propeller shaft 60 extends forwardly with respect to the vehicle from a point intermediate the engine A and the torque converter T, driving a conventional differential gear. Shaft 60 may be considered a load shaft as commonly termed in this art.

Figure 2 shows the engine shaft at 1, mounted to rotate shaft 2 carrying clutch plate assembly 64 on splined hub 63 and to rotate hollow shaft 9 carrying clutch plate 66 assembly on splined hub 65.

Hollow output shaft 9 supports splined bevel gear 12 constantly meshed with bevel gear 14 affixed to, or integral with jackshaft 60 mounted on bearings 17 in casing 20. Sleeve 15 concentric with shaft 9 is mounted to rotate about shaft 2 and has splined gear 16, roller clutch member 18 affixed thereto, and the rightward end is integral with turbine element 30, the output member of the converter unit T.

Roller clutch member 21 has external splines 21a aligning with teeth 24 and 23 of drum 9a which is a continuation of shaft 9. Slider 25 is internally splined at 22 to mesh with teeth 21a and teeth 24, and externally toothed at 26. When slider teeth 22 mesh with teeth 23 of drum 9a the output member 21 of the roller clutch F is released.

Countershaft 29 with integral gears 27 and 28 is driven by gear 16, reverse idler and gear 27 from the turbine T, but gear 28 cannot transmit the power until slider 25 couples gear 28 with teeth 23 of drum 9a when drive is in reverse. With slider 25 placed as shown in Figure 2, the drive is in forward, as far as gear assembly R is concerned. The torque then passes through the turbine T to shaft 15, roller clutch members 18, 21, slider 25, teeth 22—24 and sleeve 9. The word "couples" is used above in the common mechanical sense of connecting.

To shaft 2 is splined the turbine impeller 40, supported by bearing 91. The turbine casing 20a has attached reaction blading 50a and 50b. Rotation of the impeller 40 causes the enclosed fluid to move outward from the shaft center and flow in a helicoidal path about the "eye" of the turbine.

Rotor 30 has attached to it ring of blades 31 and 31a, the first receiving kinetic energy from impeller 40; the second from the reaction effect of blades 50a. A second stage provides an increment of power from reaction blades 50b to rotor 30. Special forms of turbine construction are not involved in this invention. The device T described herewith provides rotation of rotor 30 at varying speeds with torque multiplication, with reference to power supplied shaft 2. Such devices are well known in the art.

Infinitely variable speed ratios are thus provided between the shafts 1 and 60 when the clutch C is engaged. Clutch F can permit the vehicle to freewheel at such time.

When clutch D is engaged, the drive is transmitted from the engine to shaft 60 at the fixed ratio of gears 12—14, which may be a reduction, overdrive or one-to-one ratio. With clutch C disengaged, shafts 2 and 15, and turbine elements 30, 40, come to rest, roller clutch F permitting shaft 9 to overrun shaft 15, the rollers of roller clutch F idling.

It is not deemed necessary to show the details of construction of roller clutch F, since its function of permitting shaft 9 and drum to overrun shaft 15 has been clearly stated.

When slider 25 is in mid-position, teeth 24 are demeshed from teeth 22 of member 21, but partial mesh with drum teeth 23 is had, so that slider 25 fully releases roller clutch F when the external controls place it in reverse drive control position. The slider is moved by fork 113 from shaft 112 and lever 111 of Figure 1.

In the arrangement of Figures 2 and 3, only one servo cylinder assembly is needed to perform the work of shifting the drive between the torque converter and direct drive clutches.

The engine A is at the left, connected to the flange of shaft 1, and flywheel 1a. The torque converter clutch C and the direct drive clutch D are grouped together at the left, and controlled by a single operating means, mounted on casing 20. This construction provides the installation of the converter unit T in a sealed housing, which simplifies the problem of protection against leakage of liquid.

Flywheel 1a supports presser plates 61 and 62, the transmission shaft 2 carrying splined hub 63 and clutch disc 64 having facings 64a. Hollow shaft 9 rotates on shaft 2 and carries splined clutch hub 65 attached to clutch disc 66 having facings 66a.

Shaft 9 may drive bevel gear 12 meshed with bevel gear 14 attached to shaft 60 either through clutch D, directly driven by the engine, or through clutch C and the torque converter T.

The clutch operating mechanism provides alternate gripping of either of clutch discs 64 or 66 to shaft 1, coupling shafts 2 or 9 to the engine respectively.

Fittings 67a bolted to flywheel 1a at 67c as in Figure 3 are arranged to restrain the edges of compound disc spring 70, the inner edges of which may be shifted to the right or left by movement of bearing 71 and sleeve 72 longitudinally through eccentric yoke 73 moved by linkage external to the clutch compartment.

The shift force applied to disc spring 70 has fulcrum points at studs 67 and members 67a. The presser plate 62 carries studs 75 passing through apertures 76 in the disc spring 70, the studs carrying fulcrum ring 77. A fulcrum portion 62a of presser plate 62 affords bearing opposite the fulcrum point of ring 77.

When bearing member 71 is moved to the left by yoke 73, the disc spring 70 exerts a pull on plate 61 through studs 67, against presser plate 62, thereby clamping clutch disc 66 for solid rotation with the flywheel 1a, for establishing direct drive.

When collar 72 and yoke 73 are shifted to the right, the fulcrum 77—62a reverses the force on studs 67 and the effort is transmitted through fittings 67a to clamp the clutch disc 64 between presser plate 61 and flywheel 1a.

This disengages clutch D and couples the disc 64 of clutch C to the engine, establishing drive through turbine device T between the engine and shaft 9.

The simple rocking of lever 81 attached to eccentric shaft 80 suffices to shift back and forth between converter and direct drive, the shaft 80 shifting yoke 73 and bearing 71.

The disc spring assembly and the operating mechanism rotate with the flywheel 1a, as will be understood from inspection of Figure 3. The longitudinal motion applied through yoke 73 and bearing 71 attached to collar 72, shifts the disc spring 70 through center, to loading condition on either side of center, and when the eccentric 80 is moved by lever 81 to mid-position, the disc spring 70 is held on center, and both clutches C and D are disengaged.

As viewed in Figure 2, it will be seen that since yoke 73 and bearing 71 are in right-hand position for engaging converter clutch 64 and in left-hand position for engaging direct drive clutch 66, the eccentric 80 and external controls are required to be related about the center of motion of the eccentric 80 so that the latter is on center at mid-position. Further, lever 81 has to rock toward the eye of the observer in Figure 2, to put the yoke 73 and bearing 71 in left-hand position, and away from the eye to shift them to right-hand position.

Since, in the present construction, it is desirable that the actuation system for the clutches be biased normally for converter drive, i. e., with clutch C engaged, the normal position for lever 81 will be away from the eye of the observer, and the eccentric 80 will be rocked to hold the yoke 73 and bearing 71 in the right-hand position, for engaging clutch C.

This is shown in Figure 4, with eccentric 80 shown rocked to the right, and servo biasing spring 102 in fully extended position.

The clutch actuation lever 81 affixed to eccentric shaft 80, outside the casing 20, occupies three control positions, one for the establishing of converter drive, a mid-position for neutral, and an opposite position for direct drive, in accordance with the designated positions in Figure 4 for the eccentric 80.

Further in this specification will be disclosed a method of stopping the lever 81 indefinitely in the mid, or neutral position for full clutch release.

Lever 81 is pivoted to piston rod 100 at yoke 101, the piston 103 sliding in cylinder 105 mounted on the casing 20. Biasing spring 102 normally loads piston 100 to the lower position of Figure 4, and when fluid pressure is admitted through port 106 and pipe 107, the piston 103 is forced to shift upward and compress spring 102.

Pressure from pipe 107 in cylinder 105, therefore shifts lever 81 to a position to put in the direct drive clutch D and release the converter clutch C.

At a point midway of the normal stroke of piston 103 in cylinder 105, a side port 109 is placed, connected to expansion chamber 110, mounted about the cylinder 105. When air is being admitted to pipe 107 to shift the piston 103 against the action of spring 102, the uncovering of port 109 by the piston 103 causes the piston movement to dwell, until the pressure in the expansion chamber 110 is equal to that behind the piston 103 and in pipe 107. The release of pressure in pipe 107 permits spring 102 to shift the piston 103 downward, but during this shift, the dwell effect of the expansion chamber is not needed, and is therefore not provided.

Figure 7:
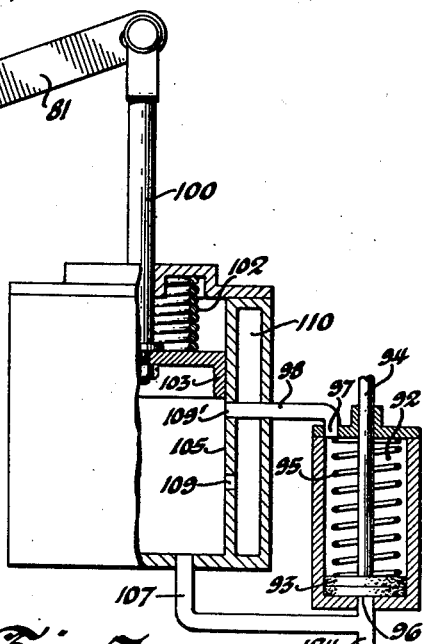

As described to this point, the dwell effect at the mid-point of the piston stroke, when pressure is being admitted to pipe 107, is momentary, that is, until the pressure in chamber 110 is equalized, whereupon piston 103 resumes its upward travel, as in Figure 7. On the return stroke, under the force of spring 102 and piston 103, the cut-off action of the edge of the piston at port 109 is such that no appreciable dwell occurs. In passing from direct to converter drive, the cushion drive effect of the fluid turbine is available for torque shock absorption, hence no dwell in clutch shifting is needed.

Figure 6:
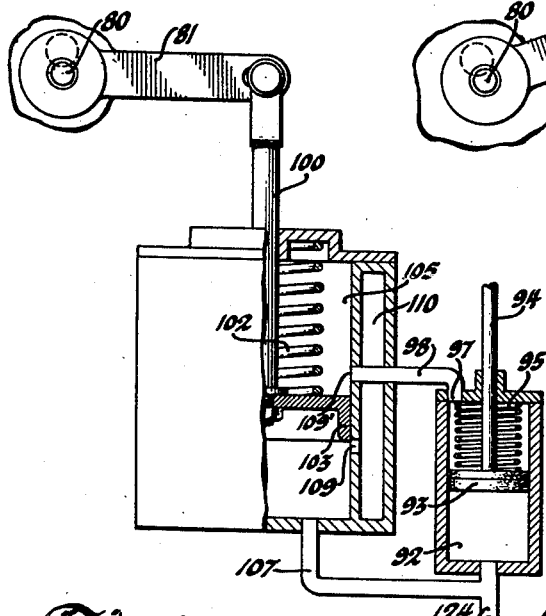

Figures 5, 6 and 7 show the three operating conditions of the Figure 4 construction in connection with the master valve described in Figure 8.

The air pressure from the main servo pipe 124 controlled by master valve V is delivered to pipe 107 and cylinder 105 whenever the valve is open, that is, whenever it connects the reservoir with line 124.

This air pressure is also delivered to port 96 of cylinder 92, in order to move the engine throttle from an open position toward engine idling position. Cylinder 92 mounted conveniently on the vehicle, with respect to the engine throttle control, contains piston 93, and rod 94, linked to the engine throttle control mechanism. Whenever air pressure exists in line 124, the piston 93 is pressed against the action of spring 95, except when the condition of Figure 7 is met, when line pressure from 124 is exerted on both sides of piston 93, permitting spring 95 to shift piston 93 and rod 94 to the right, as in Figure 7.

Port 97 and pipe 98 connect cylinder 105 with cylinder 92 at the opposite end of cylinder 92, so that under the Figure 7 condition, there is equal pressure on both sides of piston 93. When this occurs, the spring 95 holds piston 93 at the full end of the stroke, as shown in Figure 7, so that the throttle pedal action is not interfered with.

The magnet valve V shown in Figure 8 is the master controlling valve for the clutch servo system of Figures 5, 6 and 7. It is connected through pipe 120 to a reservoir of air pressure (not shown), supplied by a conventional automatic pump common in buses and transport vehicles today. The outlet pipe 124 from valve V feeds cylinders 105 and 92, of Figures 5 to 7, and the valve exhaust to atmosphere is shown at 134.

Valve casing 90 encloses sliding valve stem 126 in bore 126a drilled out centrally in coil sleeve 132, and cross ported at 133 to register with exhaust port 134 leading to pipe 134a; an air valve 142 is arranged to seat in member 144 at 144a, to seal off passage of air pressure chamber 121 connected to inlet pipe 120.

Cylindrical ring 131 embodying seat 141 is set in the casing 90 and separates the servo outlet chamber 121a from the exhaust space about the upper portion of valve stem 126.

The stem of valve 126 projects upward into the recess of solenoid coil 135 acting as an armature for moving the valve when current is furnished from external circuits to be described. Spring 143 rests under the air valve 142 tending to hold it firm on the seat of plate 144, sealing off chamber 131 from chamber 121a.

When current is supplied to coil 135, the armature portion 126 is drawn down by the flux field generated, shifting the valve 142 against the tension of spring 143, causing a seal at 141, preventing atmospheric leakage to port 134; the lower valve 142 is unseated by the abutment of valve 126, admitting compressed air from line 120 and chamber 121 to space 121a and outlet pipe 124.

While current flows in coil 135, the air reservoir is constantly connected to servo feed pipe 124, and cylinders 92 and 105. When the circuit is broken, the magnetic flux field collapses in coil 35, and spring 143 shifts 142 and 126 upward, sealing off the compressed air supply from the cylinders 92 and 105.

The principal effect of current flowing in valve coil 135 is then to admit air to servo cylinder 105, to actuate the direct drive clutch, and when the external circuit is broken, spring 143 shifts the valving 142—126 to exhaust position, permitting spring of Figures 4 to 7, to actuate the converter clutch C.

The diagram of Figure 9 shows the servo device of Figures 4 to 7, the magnet valve of Figure 8, and the connection of a centrifugal governor G in the control circuit of the valve V, supplying battery current when the governor reaches a predetermined speed.

Figure 9 is a schematic diagram of a flyball governor G driven from gear 60a of shaft 60 of Figure 2, by gear 45 on governor shaft 45a. The battery current is led to central electrode 43, slidable into and out of contact with fixed electrode 42, with increase and decrease of applied speed.

Assuming the vehicle to be driven by the turbine drive, battery current being led to governor contact sleeve 43, the latter makes contact with switch 42, at a given governor speed and through dash switch $S^1$, is delivered to coil 135 of valve V. When this circuit is completed, the master valve delivers air pressure to cylinders 92 and 105, the engine throttle lever 35 is moved to idling position and the servo cylinder pressure moves piston 103 upward, rocking clutch actuating lever 81 upward, engaging clutch D of Figure 2, and releasing clutch C. Throttle lever 35 is pivoted to rod 94 at 35a.

When the piston 103 uncovers port 109', air pressure passes from cylinder 105 to line 98, and to the opposite end of cylinder 92, whereupon spring 95 returns piston 93 and throttle connected rod 94 downward, so that the normal operator control of throttle 35 by rod 94 from the accelerator pedal (not shown) is restored.

In order to prevent the above-described automatic throttle-control action from reacting upon the foot pedal of the operator, a lost motion connection is utilized between accelerator rod 31 and rod 94.

This consists of rod 94 attached to piston 33, housed in cylinder 32 attached to accelerator pedal rod 31, the balanced springs 34 always tending to center the cylinder 32 and piston 33 as shown in Figure 9.

The governor assembly G is driven at gear 45 by a connection from the drive of the vehicle, such as gear 60a of jackshaft 60, the gear shaft 45a carrying the conventional centrifugal weights linked to contact member 43. When centrifugal force falls off due to low speed of shaft 60, the governor return spring 46 breaks the circuit at 42—43, the valve V is returned to exhaust position so that the air pressure in cylinder 105 is exhausted, and the clutch D is disengaged by spring 102, which thereupon engages clutch C, establishing drive in the torque converter.

This is a simple speed responsive control for the change of speed ratio. The dash switch $S^1$ provides the operator with means to energise and de-energise the governor control circuit of Figure 9.

The preceding described organization of Figure 9 and the apparatus controlled thereby provides an automatic control means for the transfer of drive between the torque converter and the direct drive afforded by clutch D of Figure 2, with interlocking means to compel the sequences for shifting a positive jaw clutch located in the direct drive position, such as described in my United States Serial Number 189,596 now U. S. 2,272,434 aforesaid, or the double friction clutch of the Figure 2 showing herein. The above-described automatic control upon the engine throttle provides means to expedite the shift interval, and to reduce the differential of torque at the clutch assuming the vehicle torque.

In starting the drive control description herein, it is assumed that the vehicle is standing still, the engine idling, with the manually operated shift mechanism of Figures 2 and 10 positioned for neutral or no drive.

Under these circumstances slider 25 of Figure 2 is placed so that any residual torque on shaft 15 is not transmitted to shaft 9. The operator may warm up his engine by manipulation of the accelerator pedal, and while clutch C of Figures 1 and 2 is loaded for engagement by spring 102 of Figure 4 acting on lever 81, no torque is transmitted to output shaft 60, although the turbine impeller is being rotated by clutch C.

The shifting of the operator's control lever 145 of Figure 10 to "forward" reciprocates rod 116 of Figure 1 and slider 25 of Figure 2 couples sleeve 21 to drum 9a of shaft 9. This shift is ordinarily done with the engine idling, so that the impeller 40 of the turbine T is incapable of delivering but a light drag torque since the centrifugal fluid effect is at a minimum at low speed.

Advancing the accelerator pedal to open the engine throttle speeds up the impeller 40 and because of the well-known effect of circulation of fluid in turbine T, the output member 30 is caused to rotate with increased speed as the engine speed is raised by the operator. Since slider 25 couples elements 21 and 9a, the roller clutch F between elements 21 and 18 is capable of transmitting torque during the interval when shaft 15 connected to the turbine output is coupled to shaft 9 coupled to the final drive shaft 60. If the operator move the engine throttle toward closing, the vehicle will coast, and roller clutch F will permit shaft 9 to run ahead of and free from shaft 15.

During the above described actions, governor G of Figure 9 is being rotated at increasing speeds. The operator desiring to establish automatic control of the drive closes switch $S^1$. The moving governor contact 43 is then capable of closing the circuit through solenoid valve 135, admitting air pressure to pipe 107 for shifting the clutch C to disengaged position, and clutch D to engaged position. At the instant of shift transition when clutch C is becoming disengaged, the engine is rotating faster than direct drive shaft 9, and being relieved of torque by the opening of clutch C would tend to race, putting a high differential of torque on the friction facings of clutch D. To obviate this, the engine throttle is momentarily closed by the structure described in connection with Figures 4 to 7 inclusive, and shown in external view in Figure 9.

The admission of air pressure to line 124 not only tends to raise piston 103 toward declutching of clutch C and clutching of clutch D, but also gives full stroke to piston 93 against the force of spring 95 as indicated in Figure 6, rocking throttle lever 35 of Figure 9 toward closed position. However, as soon as the piston 103 uncovers port 109', to admit the air pressure of line 107 to the upper side of piston 93 of the auxiliary throttle control system, the air pressure on both sides of piston 93 is the same, and spring 95 may therefore return the throttle mechanism to its former position.

This arrangement thereby provides a momentary throttle closing action which reduces the torque differential to be absorbed on clutch D as that clutch is assuming the drive of the vehicle. It should be noted that the normal control of the engine throttle arm 35 is obtained by the conventional pedal connected to rod 31, and that the operator, at the interval of shift, may be endeavoring to hold a given engine throttle setting by ordinary manipulation of the accelerator pedal. The taking over by the governor controlled mechanism of Figures 9 and 4 to 7, of the throttle control, momentarily removes from the operator's pedal foot, the normal throttle response action. The admission of air pressure to line 124 by solenoid valve 135 takes the normal throttle control away from the driver's accelerator pedal foot, and the equalizing of air pressure on both sides of piston 93 by the passage of piston 103 upward, past port 109', restores the operator's normal foot pedal acceleration and deceleration control of engine speed.

To prevent the awkward feel of the accelerator pedal being moved from under the driver's foot by the automatic throttle closing mechanism, the lost-motion device 31—32—33—34 of Figure 9 is furnished, the yielding springs 34 permitting the automatic action without a pronounced varying of the feel of the accelerator pedal under the operator's foot to any noticeable degree. The head end of rod 94 between the spring 34 may move a limited distance, without changing the effective pressure of the accelerator pedal against the operator's foot.

As far as Figure 9 is concerned, the maintaining of speed of the vehicle at above the critical shift-over speed for which the governor G is designed, holds contacts 43—42 of Figure 9 together, so that the drive is maintained in direct by clutch D, while the torque converter T stops, because clutch C is disconnected.

Upon the falling off in speed of the governor G, the contact 43 moves away from contact 42, breaking the circuit through the solenoid valve 135, and as described in connection with Figure 8, spring 143 acts to seal off the compressed air supply and shift the valving 142—126 to exhaust position, venting the pressure in cylinder 105, so that spring 102 of piston 103 rocks the assembly of Figures 4 to 7 inclusive attached thereto to the position shown in Figure 5. This declutches clutch D and causes clutching of clutch C which connects the drive through torque converter T once more.

Since air pressure is simultaneously relieved in cylinder 105 and cylinder 92, the only possibility of air pressure effect on the throttle control would be the trapping of air at a greater pressure in cylinder 92 above piston 93 during the interval when piston 103 was blocking port 109', but since such pressure is only effective to work with spring 95, the throttle control apparatus is not thereby capable of closing the throttle or of interfering with the normal throttle action.

Switch S¹ is always available to the operator for relieving the air pressure under piston 103, and compelling the shift of drive to clutch C, so that in an emergency when converter drive is desired, the operator may always put in the multiplied torque regime of drive. In driving through heavy city traffic, this control enables the driver to drive continuously through the turbine, for frequent stop runs, avoiding wear on the shift mechanism and obviating any shift dwell action in maneuvering the vehicle.

For understanding of the forward and reverse shift mechanism, it is necessary to trace from Figure 2 to Figure 1, and to refer to Figures 10 and 11.

Slider 25 has been described as setting up one of the two trains for forward or reverse, by coupling the turbine shaft 15 to shaft 9 through roller clutch F, or through gears 16, 27, 28, 23, in connection with Figure 2.

In Figure 1 is shown lever 111 attached to shaft 112 projecting from casing 20. Inside the gearbox, in dashed lines, is the forked lever connection to slider 25, shown in Figure 2 at 113.

Transverse rod 114 pivoted to lever 111 is attached to bellcrank 115 pivoted on the vehicle frame, and longitudinal rod 116 from bellcrank 115 forward is connected to gear lever assembly 145 of Figure 10.

As shown in Figure 1, lever 111 is in "neutral" position. When it is rocked about shaft 112 to the left, the slider fork 113 of slider 25 of Figure 2 is shifted to the right, for forward drive.

Rod 114 is therefore in tension due to a rearward force applied to rod 116 from the lever linkage in the driver's compartment, which upon inspection of Figure 10, is understood to result from a clockwise rocking of gearlever assembly 145 for "forward" selection, as marked. Rocking of 145 in the opposite direction exerts a pull on rod 116, a compression force on transverse rod 114 of Figure 1, and a clockwise rocking of lever 111 and shaft 112, for shifting slider 25 of Figure 2 to the left for coupling gear 28 with teeth 23 of drum 9a, for reverse drive.

Figure 10 shown gearlever assembly pivoted on the vehicle floorboard frame at 148, having extension lever 149 integral therewith, pivoted to transverse rod 116. Rod 145b occupies a central hole in the lever 145, and is integral with sleeve 147 and the extension to shifter ball 145a. Fore-and-aft motion of lever 145 shifts rod 116 in the same plane. The lower end of rod 145b abuts the pad 153 of lever 150, pivoted beneath the floor, the lever 150 operating switch S² when the ball 145a is depressed against the action of spring 155 shrouded in sleeve 147.

The switch S² connects leads 170 and 170a to operate the neutral-compelling mechanism of Figures 12 to 14. It is also intended to be placed in the battery circuit of Figure 9 in series with solenoid 135 and in parallel with switch S¹ and governor contact 42, for operation when changing gears, to avoid inertia drag of the transmission by shifting and locking the clutch lever in mid-position.

As shown in Figure 10 a hairpin spring 146a normally separates the switch contacts, but rocking of levers 150, 146 by downward movement of shaft 145b, rocks the movable contact to connect leads 170 and 170a, to energise solenoid 135 as suggested by the dashed line of Figure 14, or for energising both solenoids 135 and 160 of Figure 14.

A view partly in section of switch S² is given in Figure 10a. The casing 146c by which the switch is attached to the underside of the vehicle floorboard is made of heavy insulation material, and carries cross shaft 146d to which is attached movable contact 146e mating with fixed contact 146f wired to external lead 170. A pigtail connection connects the contact arm of 146e to external lead 170a. Hairpin spring 146a is coiled around a narrowed projecting portion of shaft 146d adjacent the head of attached arm 146, its upper leg being snap fitted into a small hole in the casing and its lower leg resting against lever 146, so that its tension tends to rock the contacts 146e and 146f apart. The forked end of lever 146 coacts with the intersecting pin of arm 150 in a past-center motion, as rod 146b depresses seat 153 to rock lever 150 clockwise. This is a common form of non-grounded single-pole switch, and may take a number of different forms for executing the designated action.

Switch S² operates the neutral-compelling mechanism described further in connection with Figures 12 to 14, through lever 146 pivoted to lever 150. When ball 145a is depressed the switch is made active, that is, it connects leads 170 and 170a, and when the ball is released, spring 155 and hairpin spring 146a return the mechanism to the position shown in Figure 10.

The sectional view of Figure 11 shows lever 150 movable with the rocking shifter motion of rod 116. On the inner face of lever 149 is welded guide key 151. Pad 153 of lever 150 moves in an arc to intersect key 151, and notches 154F, 154N and 154R respectively are the positions occupied by the tongue of the key 151 when the hand-lever assembly 145 is placed in the reverse, neutral and forward positions.

The lever assembly 145 cannot be rocked through these positions until gearshift ball 145a and rod 145b are depressed sufficiently to swing lever 150 and the notches of pad 153 clear of the key 151.

When the new shift is accomplished, the springs 155 and 146a return the rod 145b and notches to locking position. This interlock is to prevent accidental movement of gearlever 145 without the deliberate action by the operator, of depressing the gearshift ball 145a, so that key 151 can be swung out of the way. Switch $S^2$ as described above, is intended to be placed in the battery circuit of Figure 9, in series with the solenoid 135 and in parallel with switch $S^1$ and governor contact 42, so that when changing gear in the forward-and-reverse gearbox, the drag of the turbine may be relieved and the inertias at the point of mechanical shift may be of low values.

On the movement of the gearshift handle to any of the three positions, the ball 145a and rod 145b are depressed against the action of spring 155, and lever 150 is rocked, moving switch $S^2$, and energising electrical circuit to solenoid valve V of Figure 8. This admits air pressure to servo cylinder 105 of Figure 5, and shifts the clutch lever 81 as if direct drive were going to be established through clutch D.

At this point the system such as shown in Figure 14, may also become effective since, when the handlever operated switch $S^2$ is engaged, a second solenoid is energised to lock and hold the piston rod 100 so that the clutch actuation lever 81 is stopped in mid-position as will be explained in detail further in connection with Figures 14 and 17.

Figures 12 to 14 illustrate a holding mechanism for latching the control mechanism for the clutches C and D in neutral position, with the circuit therefor being shown in Figure 14, and noted schematically in Figure 17. Figures 12 and 12a show solenoid coil 160, having armature 161 extended in fork 162, to intersect the motion of piston rod 100, of servo piston 103 of Figure 9, arranged to operate clutch actuating lever 81. The rod 100 has two diameters, meeting at shoulder 163. Figure 12 is a vertical cross section of the lock mechanism operated by the solenoid 160, the abutment plate 165 being conveniently bolted to the casing 20 adjacent the cylinder 105 and rod 100, and affording a mounting for the solenoid 160.

The plate 165 is centrally apertured for free passage of the piston rod 100, and flaps 165a are slotted and turned from the plate 165 as shown, to act as guides for the fork 162. The fork 162 has a smaller and a larger aperture, so that when the solenoid 160 is energised, the fork will shift to the right, the smaller aperture intersecting the path of shoulder 163 of rod 100.

As the air pressure shifts the rod 100 toward direct drive position, the shoulder 163 meets fork 162, which is supported by plate 165 preventing the further travel of piston toward direct drive position.

This is the neutral position of rod 100, and consequently lever 81, both clutches D and C of Figure 2 being disengaged.

When the current to solenoid 160 is cut off, return springs 166 fastened to the plate 165 and to pins 166a in fork 162, shift the armature 161 and fork 162 to the left, the release of air pressure by valve V releasing the binding force on shoulder 163 of rod 100, so that servo piston return spring 102 of Figure 9 is effective to return the mechanism to converter drive position.

The handlever operated circuit is shown in Figure 14. Switch $S^2$, shown in Figure 10 as being operated by lever 150, rod 145b and ball 145a, is connected by lead 170 to the battery, in series with the circuit through solenoid coil 135 of master valve V described in detail in Figure 8.

This circuit is independent from that operated by the governor of Figure 9. Since the handlever 145 will not normally be operated when the governor G would be at a speed sufficient to energise the circuit through contacts 42 and 43, there is no interference between the automatic and hand controls.

When the handlever of Figure 10 is in any one of the reverse, forward, or neutral positions, the circuit to switch $S^2$ is inactive.

To facilitate understanding of the compounded circuit arrangement, Figure 14 shows the circuit of Figure 9 superimposed thereon in dashed lines.

Figure 15 presents the schematic arrangement of the controls, with particular respect to the overruling control by the operator's accelerator pedal of downshift from direct drive, the control intercepting the circuit from governor G to magnet valve of Figure 8 controlling the air pressure to cylinder 105 of Figure 9, for example.

At the left of the figure, accelerator pedal 8 and lever 259 are pivoted to the floor of the driver's compartment, and lever 259 is pivoted to bellcrank 156, mounted beneath the floor. Bellcrank 156 is pivoted to throttle rod 31 which operates throttle lever 35, similarly to the construction of Figure 9.

The remainder of the system is the same as in Figure 9 except for the connections to the solenoid 135 of valve V. The lead wire from governor contact 42 instead of passing through dash switch $S^1$ directly to the solenoid contact, in Figure 15, is carried forward to switch $S^3$, of common construction, mounted under the vehicle floorboard.

Switch $S^3$ has one contact point for lead wire 171 from 42 and $S^1$, and another for lead wire 172 to the solenoid 135 of valve V. Switch $S^3$ always connects leads 171 and 172 together, so that under normal operation, the driver of the vehicle with Figure 9 equipment would know no difference between it and that of Figure 15.

At beyond full throttle position of accelerator pedal 8, it encounters button 167, mounted in a floorboard fitting, loaded to occupy a normal upward position by spring 168, the rod 167a of button being pivoted to switch lever 169 of switch $S^3$.

When the pedal 8 is depressed so as to stress spring 168, the operator's foot on the accelerator pedal feels the added resistance of the spring, to that of the normal throttle closing spring 157. Now if the operator so desire, the pedal 8 is pressed still further, until button rod 167a rocks lever 169 far enough to operate switch $S^3$, and break the circuit between leads 171 and 172.

This interrupts the current from contacts 42—43 to solenoid 135 of valve V, the valve immediately shifting to air pressure release position, as has been explained above, releasing clutch D and engaging clutch C, through the mechanism of Figures 4 to 7.

While the operator holds button depressed and switch $S^3$ disconnected, the governor G is incapable of putting in direct drive through clutch D, and the drive of the engine is transmitted at full engine throttle through clutch C and the converter T to the vehicle wheels.

In operating the vehicle on heavy gradients, this provides maximum engine power at a net speed ratio reduction, or with mechanical advantage, since the turbine yields these results.

Should the operator move the throttle toward closing so that the switch S³ resets itself to restore the 171—172 circuit, the current is restored through contacts 42—43, unless the vehicle speed has fallen off below the speed at which the governor G can hold these latter contacts engaged. The governor assumes immediate charge of the drive, however, as soon as the switch S³ restores the circuit to solenoid 135 of valve V.

Switch S³ is of the same type as switch S², except the latter is biased by a hairpin spring to circuit disconnection position, whereas S³ is biased by spring 168 to circuit connection position. These switches are of common type, it being deemed unnecessary to show the internal construction thereof.

Switch S¹ is a common two-position device mounted conveniently on the vehicle dash and may be used to eliminate the governor action entirely, and compel continuous drive through clutch C and the torque converter T. This enables the bus operators in crowded traffic to make frequent stops without being concerned with getting into direct drive, since all that is required is to place the switch in the "off" position, removing all battery current from any of the lead circuits to the relay and actuation means, so that magnet valve V is unable to admit air pressure to actuate the direct drive shift, and clutch C will remain engaged, causing turbine T to drive.

In order to facilitate the maneuvering of the remote control manual shift for forward, neutral and reverse, the present invention shows alternate means to those shown preceding in connection with Figures 10 to 14, to put the friction clutches C and D in disengaged position simultaneously.

This is accomplished through the control arrangement of Figure 17 in conjunction with the structure of Figure 16.

The gearlever 245 of Figure 16 is clamp-fitted to shaft 246 mounted in control box 247 adjacent the vehicle driver's position. The shaft may rock freely with lever 245 in the fore and aft plane, and the fitting 248 is articulated so as to permit a small movement laterally of shaft 245.

The face of casing 247 is slotted at 249 in E-formation, the slot guiding the lever 245. The upper lateral tongue of the E is the forward driving position of the lever, the central tongue for neutral and the lower tongue for reverse.

The casing 247 supports switch S⁴ mounted adjacent the portion of lever 245 inside the casing, and preloaded spring 251 resting against the near face of the switchbox and fitted in a notch 245c of the lever, biases the lever toward the right, or tongue positions of the slot, away from the portion which permits free fore-and-aft movement. Normally, then, the lever occupies a rightward position, loaded by the spring 251, to remain in one of the three tongues of the slot. Striker pin 252 of switch S⁴ is arranged to operate its switch elements, as is common practice in such switches as used herein as an illustration, and when the lever 245 is moved into the free portion of slot 249, that is, toward the left, the striker pin 252 is pressed into the switch casing, actuating the contacts of switch S⁴, and thereby energising circuit 170—170a, which as has been previously described in connection with the diagram of Figure 14, and also to coil 135 of magnet valve V.

This results in admission of air to the cylinder 105 through line 124, shifting it against the compression of spring 102, while the fork stop 162 of Figure 14 is preset to lock the rod 100.

Thus when the gearlever 245 is moved sideways to the left of the notch 249, the switch S⁴ is tripped, energising the solenoid 160 and setting the lock bar 162, so that the piston 103 of cylinder 105 is halted in mid-position by the construction described in Figures 12 to 14.

The magnet valve V at the same time has admitted compressed air to cylinder 105 against the return spring 102 moving the piston 103 to mid-position as described above.

When the sidewise motion of the gearlever 245 is completed, the lever is then shiftable freely in either of the forward or reverse directions, to manipulate the rodding of Figure 1 and the shifter fork 113 of Figure 2 as described in connection with those figures; since the torque drag of the idling engine is completely removed. The halting of rod 100 in mid-position disengages both clutches C and D as described preceding.

The magnet valve V maintains air pressure to hold the stop 163 of rod 100 against plate 165 of Figure 12, until the operator places the lever 245 in one of the three tongue positions of forward, neutral or reverse, because the striker pin 252 cannot release switch S⁴ and break the 170—170a circuit while the lever is in the free portion of slot 249, by virtue of the lateral spacing dimensions.

In the diagram of Figure 17, the structure of Figure 16 is shown schematically, the switch S⁴ being shown connected to wires 170 and 170a, which by reference to Figure 14, will indicate that the arrangement works approximately the same as shown in Figures 10 and 14.

The control arrangement, however, is shown as applied to a Diesel power plant installation. Accelerator pedal 8, lever 259, bellcrank 156, rod 31, lost motion connection 32—33—34 and rod 94 are the same as in Figure 15.

The accelerator pedal overruling arrangement of Figure 15 is left out of Figure 17 for the sake of clarity, although it may be superimposed thereon in the same manner that the disclosures of Figures 14 and 15 may be combined, as noted herein.

Rod 94 in Figure 17 is connected to a three-armed bellcrank 255, one work arm being linked to Diesel engine injector rack 257 through rod 256, the rack arm increasing the injector fuel increment as pedal 8 is depressed, return spring 256' conveniently moving the pedal toward throttle-closing position in the conventional manner. A second work arm of bellcrank 255 is joined to rod 94' attached to piston 93 of the throttle closing mechanism previously described.

The remainder of the elements shown operate exactly as previously described in this specification.

The forward, neutral, reverse control for compelling full release of engine torque when shifting slider 25 of Figure 2, has been described above. This serves the very useful purpose of freeing the driving mechanism for the mechanical meshing and demeshing of slider 25, and is deemed an important contribution.

Gearlever 245 of Figure 17 is shown loaded by biasing spring 251, the view being taken as if the observer were viewing the casing in section, from some point adjacent the reverse end of slot 249.

The actuation of striker pin 252 connects battery current from 170 to 170a, energising solenoid 160 and magnet valve V, as above described. It should be noted that this neutral-compelling circuit is only carrying current when the lever 245 is in transit between the positions of forward, neutral and reverse, so that current consumption for this portion of the invention is at a minimum.

The lever 250 is attached to shaft 246 and is pivoted to the mechanical shifter system similarly to lever 149 of Figure 10.

It was stated above that in the demonstration of Fig. 17, the accelerator pedal overruling arrangement for providing operator overcontrol of the governor drive selection action, was omitted for the sake of clarity. In order to avoid any misunderstanding on this point, Fig. 17a is provided, wherein the pedal overrule switch S-3 is shown placed in the circuit 171, 172 so that while the governor G may normally cause the clutch servo mechanism to connect either direct or converter drive, the opening of pedal switch S-3 at substantial full throttle position, may disconnect the lead 171 from lead 172 and enforce downshift to converter drive by disconnection of coil 135 from the live current of leads 170.

The members of the elements in Fig. 17a correspond to those of the same elements in Figs. 15 and 17.

Operation

The operation is described in connection with the structures of Figures 1 to 14 inclusive. With the vehicle standing still, engine running, the operator rocks handlever 145 of Figure 10 to forward position connecting shafts 9 and 15 through slider 25. Since the engine is idling, the flywheel 1a and connected parts have idling rotation. The vehicle being at rest, the governor G of Figure 9 is holding the circuit of valve V open, so that no air pressure exists in pipe 124, therefore servo piston biasing spring 102 is holding in the converter clutch C, but the converter T has then only idling rotation insufficient to cause forward drive of the vehicle.

The operator in moving lever 145 of Figure 10 must depress the ball 145a in order to clear key 151 from the notch 154N of pad 153 of lever 150, which operates switch S², shifting the servo piston rod 100 and clutch actuating lever 81 to mid-position, holding fork 73 of the clutch spring 70 on center. This action declutches the turbine clutch C and holds direct drive clutch D disengaged. Since these responses occur before gearlever 145 can be rocked at all, the inertias of the rotating parts are low, and slider 25 couples shaft 9 to roller clutch ring 21 of Figure 2 readily.

From here on the operator need not touch the gearlever, allowing it to remain in "forward" even when the vehicle is stopped for passengers or load changes, since at engine idling speeds, the torque converter T idles without driving the vehicle. The vehicle may be freely started and stopped by accelerator pedal and brake movements without restrictions. When the road speed of the vehicle reaches a predetermined range, for example, 18 to 20 miles per hour, the governor G connects the battery circuit at 42—43 of Figure 9 and magnet valve V admits air pressure to servo cylinder 105, actuating clutch D and releasing clutch C. During this shift interval, the engine throttle is momentarily moved toward closed position and restored to normal operator-pedal control by the action of the mechanism 92—93—94—95 described above in connection with Figures 5 to 7.

This latter feature shortens the slip interval for the direct drive clutch D, lengthening the effective life of the clutch, as well as speeding up the transition to direct drive.

When the vehicle speed drops below that for which the governor weight and spring effects maintain contacts 42—43 together, the circuit through magnet valve V of Figure 8 is broken, the air pressure in cylinder 105 and expansion chamber 110 exhausting through pipe 134a. This releases clutch D and causes clutch C to be engaged. On the return stroke of piston 103 of Figures 4 to 7, when port 97 is sealed, the air pressure trapped in line 98 and the outer end of cylinder 92 is higher than the diminishing pressure in cylinder 105 and line 124, therefore no undesirable change of engine throttle is created by pressure on piston 93 from these latter air spaces, on the downshift.

The forward and reverse shift system has been described above. The neutral stop action for clutches C and D has been described in detail in connection with Figures 11 to 14 inclusive.

Upon shifting to reverse from neutral, it is again necessary for the operator to depress gearlever ball 145 against the action of spring 155, and operate the neutral stop system of Figure 14. This assures a quick, easy, and quiet mesh of slider 25 with gear 28 and teeth 23 of drum 9a of Figure 2, by reducing the inertias as aforesaid.

It should be noted that in shifting out of both forward and reverse, the operator also is required to depress ball 145a, and declutch both of clutches C and D. This interrupts the torque of the drive so that whatever rolling inertias there may be, cannot bind the teeth of slider 25 or jam them against disengagement.

The operation of the construction of Figure 15 is simple, and adds to the facility of control by the driver, because of the accelerator pedal overruling device incorporated in the system. The gearlever interlock described in connection with Figures 10, 11 and 14 is used with the construction of Figure 15, without interference between the mechanisms, since switch S² is in parallel with circuit contacts 42—43 operated by the governor, as shown in Figure 14.

The Figure 15 construction permits the operator to downshift by depressing the accelerator pedal 8 at any time, against the action of the governor G. The utility of this feature has been explained above.

The feature of pneumatic automatic throttle closing for speeding up the direct drive shift in the present combination is thought to be novel, its advantages having been stated above.

The throttle operating arrangement for restoring normal operator control described in connection with Figures 5 to 7 is believed to constitute a novel sub-combination.

The interlocking manual controls described with respect to Figures 1, 10 and 11 represent a feature for easier manipulation of the forward, neutral and reverse selection mechanism, and the associated feature of holding the clutch actuation means in neutral position, such that the disc spring loading device for both clutches C and D is held on center, provides a new facility in the present art. The sub-combination feature of the expansion chamber 110 for obtaining a neutral dwell during the ratio change interval is likewise believed of particularly useful character, as outlined preceding, and novel in this art.

The particular neutral stop mechanism of Figure 12 is of definite utility in releasing the gear drive from the rotating inertias of the engine-connected power system, and the specific construction herein, in connection with the interconnected controls of Figure 14 is felt to provide utility over the prior art of definite nature.

The throttle pedal overtravel mechanism of Figure 15 by which the operator may at any time compel the transmission ratio to be shifted from direct to reduction drive through the torque converter T is an extremely useful contribution in that it enables a vehicle operator to obtain the maximum engine torque with the transmission at a favoring mechanical advantage, so that emergency and heavy load power requirements are better met. The sub-combination feature of the dash switch $S^1$ in the above combinations extends the utility of the controls marginally, so that required continuous operation in reduction drive, of a mechanism normally operating automatically to shift to a higher ratio, is easily had, and capable of being used at any time, even when the other controls are being used. It may not be desired to use the overtravel device operated by the accelerator pedal, to compel drive in reduction ratio, for the operator may desire to operate the engine at low speed, therefore the switch $S^1$ is of more than obvious utility, as a further operator control means to compel downshift.

The present invention therefore provides an accelerator pedal operated means, and an auxiliary means to compel downshift of ratio from direct to converter drive. Attention is directed also to the ability of the operator to compel neutral at any time by depression of the gearlever extension ball 145a of Figure 10. This not only aids mesh of slider 25, and demeshing thereof, but provides the operator with means for preventing any torque from passing to the vehicle wheels, even when the engine speed is high enough to create a low torque in the converter T.

If in traffic, the vehicle operator finds his engine idling speed high enough for the vehicle to "creep," he merely rests his hand on the gearlever ball 145a, depressing it against spring 155. This compels both clutches C and D to remain disengaged.

It is not deemed necessary to further describe the operation in connection with Figures 16 and 17, it being obvious from the subject matter herein that the version of the neutral-compelling control is similar to that of Figures 10, 11, and 12, except for structural details, and relative positionings of the parts.

In the case of the Figures 16 and 17 version, it is not necessary for the operator to hold the gearlever ball down, as in the Figure 10 construction, when "creep" may otherwise occur. In the modification arrangement, the gear lever 245 need only be rocked to occupy some portion of slot 249 between the forward and neutral stop positions, to cause both clutches C and D to be disengaged.

The subject matter of Fig. 17a is believed adequately described in connection with Figs. 15 and 17 without further amplification as to the operation.

Further advantages appear above in the various text sections.

The features expressly provided in this invention include an overall improvement in ease of transition between speed ratios, thru control of torque from one ratio to another during the interval of which the regulatory means tends to limit the torque shift period, accomplished by interlinkage of throttle pedal, throttle, ratio clutch control, governor and manual controls. This system as above explained is expressly adaptable to drive constructions having plural selective input friction clutches which of themselves establish the drive, as distinct from devices of this general character in which the selected ratio changing elements themselves do not terminate and initiate the torque drive interval, but rely on other drive elements to complete the drive.

It should be understood that various changes in the form, proportion and minor details of construction may be resorted to within the scope of the appended claims, and that the present invention is now limited to the specific designs and arrangements of parts herein shown.

Having thus described the invention and enumerated its advantages, I now claim as new and do desire to secure by Letters Patent the following:

1. In power controls for motor vehicles, an engine, an engine throttle, a variable speed transmission connecting driving and driven shafts which transmission includes alternatively actuatable clutches for establishing direct or reduction drive, a single member rockable to actuate said clutches, fluid pressure operated servomotor means including a piston effective to actuate said clutches through rocking of said member between limiting positions, a valve controlling said servomotor means, a governor driven by said driven shaft normally operative to cause said valve to shift in accordance with the speed of said driven shaft, an accelerator pedal movable to increase and decrease said throttle opening over a given range of pedal movement, connections between said pedal and controlling said valve effective when the pedal is moved to a point beyond its full throttle position to direct fluid pressure to move said piston to rock said member to shift said clutches for releasing direct and establishing reduction drive in said transmission, while rendering said governor ineffective to shift said valve, resilient coupling means interposed in the path of motion of said pedal and effective at beyond full throttle pedal position to provide added force to be overcome by the driver's foot, and a control connection operated by said servomotor means and effective to close and open the said throttle during change of clutch actuation by said motor means.

2. In vehicle power controls, an engine throttle, a power shaft and a load shaft coupled by a variable speed transmission which includes means for establishing reverse or forward drive and includes alternatively driving clutches engageable and adapted for being held alternately engaged by a single disc-spring means, a shifter effective to transfer the loading action of said spring means from one clutch to the other, actuating means for said shifter normally biased for selective energising of one of said clutches, power means operative upon said actuating means for overcoming the normal bias thereof and effective to shift same and said shifter to an alternate position in which the said one of said clutches is disengaged and the other of said clutches is energised, manual control means for selection of low gear and reverse drive by said transmission, a device operated by said manual control means effective to compel the shifting of said actuating means and said shifter to a third position in which both said clutches are held disengaged when the said manual control means is moved between predetermined positions, and means controlled by the power means and operative to reduce the setting of said engine throttle during the shift operation of said power means upon said actuating means.

3. In vehicle power controls, an engine driving a power shaft, a throttle for said engine, a load shaft, driving means coupling said shafts for direct and reduced speed ratio drive, a fluid pressure servo system including a source of fluid pressure, valve means directing the flow of said pressure, fluid servomotor means controlled by said valve, means actuated by said fluid servomotor means operative to establish forward direct drive, or forward reduction drive by said driving means, and a second fluid pressure motor means operated by the flow of pressure directed by said valve means and operating said throttle effective to reduce the setting of said throttle when fluid pressure is admitted by said valve to said fluid servomotor means and effective to restore the said throttle to normal setting when the said servomotor means has completed the action thereof initiated by said valve means.

4. In motor vehicle power controls, a power plant, a throttle therefor, a throttle pedal for said throttle, a power shaft and a load shaft, a variable speed ratio transmission coupling said shafts, a transmission shifter member movable to various ratio drive connecting positions, a fluid pressure actuated servomotor means for operating said member, and an auxiliary fluid pressure operated throttle control device connected with and made operative by said servomotor means, said device being thereby capable of retarding said engine throttle against the action of said pedal when said member occupies one of said positions, and further operative to restore control of said throttle to said pedal when the said member occupies another of said positions.

5. In automatic controls for motor vehicles, an engine, an engine throttle, an accelerator pedal controlling said throttle between full and idling throttle positions, a power shaft and a load shaft, a variable speed ratio transmission mechanism coupling said shafts including direct and reduction drive means, power means adapted to actuate and couple the said drive means, a control system operative upon said power means comprising a governor driven by one of said shafts tending to change ratio toward direct drive, connecting means between said system and said pedal actuable at beyond full throttle position thereof for setting aside the ratio changing effect of said governor, and a control operated by the said power means effective to close and then open the said engine throttle when said power means actuates said drive means.

6. In motor vehicle controls, an engine, an engine throttle, an acacelerator pedal operating said throttle, a load shaft, a variable speed transmission coupling said shaft with said engine, an actuating member for said transmission adapted to directly change the driving ratio thereof, fluid pressure motor means arranged to operate said member, fluid pressure directing valve means controlling said motor means, apparatus adapted to retard the setting of said throttle regardless of the position of said pedal and effective to restore the normal setting thereof, a ratio selecting control for said valve means, and a fluid pressure device operative upon said apparatus and made operable to retard said throttle by the action of said valve means for predetermined operation of said motor means and said apparatus as established by the ratio selection action of said control means and made operable by completion of the motion of said motor means and initiated by said valve means to restore the normal setting of said throttle.

7. A power control device for motor vehicles driven by engines and power transmissions, power and load shafts, an engine throttle, a pedal operating same, a variable speed drive transmission including plural friction clutches adapted to establish the coupling of said power shaft to said load shaft at selected different speed ratios, actuating power means operative to compel selective drive by said clutches, a control system for energising said power means including a governor responsive to the speed of one of said shafts and arranged to exert a force tending to change the drive toward a higher ratio, said system including a connection operated by said pedal at beyond full throttle position thereof to set aside the said action of the governor, and a control means operated by said power means for closing the said throttle when said power means is energised and for reopening said throttle when the power means has established a change of drive ratio by said clutches.

8. In power controls, an engine driving a motor vehicle through a power shaft directly connected to the engine, an engine throttle, an engine speed control pedal therefor, a driven shaft, a variable speed transmission embodying elements arranged to couple said shafts, a governor driven by said driven shaft, selectively engageable clutches effective to transmit the drive of said power shaft to said transmission elements for driving said driven shaft at different speed ratios, actuating means arranged to establish selective operation of said clutches, control means acting upon said actuating means and subject to both the speed effect of said governor and to the positioning of said pedal for selective drive actuation of said clutches, a hand control lever operative to select initial drive by one of said clutches when starting the vehicle from rest, connections linking the movement of said lever with said control means such that for given movement of the lever, the positioning action of said pedal and the speed effect of said governor on said control means are both rendered ineffective during a predetermined range of movement of said lever, and a connecting control between said throttle and said control means to interrupt the control of said pedal over the said throttle during a period of transition of drive from one clutch to another.

9. In power controls for motor vehicles, an engine, an engine throttle, an accelerator pedal controlling said throttle between full and idling throttle positions, a power shaft and a load shaft, a variable speed ratio transmission mechanism coupling said shafts including reverse, direct and reduction drive means, said mechanism including drive establishing clutches, power means adapted to actuate selectively the said clutches of said drive means, manual shift connections for setting forward or reverse drive by said mechanism, a control system operative upon said power means for selective actuation of said clutches, this system including a governor driven by said load shaft tending to change clutch actuation and thereby change ratio toward direct drive with increase of load shaft speed, connecting means between said system and said pedal actuable at beyond full throttle position of said pedal to inhibit the ratio changing action of said governor upon said clutch-actuating power means, a reactive control for said throttle operable concurrently with the said power means to close and then open the said engine throttle when said power means is made effective to actuate the change of drive by said clutches, and a connection operated by positional movement of said manual shift connections effective to interrupt the action of said power means during movement toward forward or reverse drive setting of said manual shift connections.

10. In automatic power controls for motor vehicles, an engine, a throttle control for said engine, an accelerator pedal for said throttle control, a power shaft and a load shaft, a variable speed transmission having a plurality of friction clutches adapted to couple said shafts at direct, reduction and reverse speed ratios, a control device for said transmission embodying a manual lever for setting initial low or reverse gear drive thereby, power operated automatically controlled clutch-actuator mechanism for establishing selected forward speed drive by said clutches; an automatic control for said mechanism comprising a governor driven by said load shaft arranged to select the ratios determined by said power operated clutch actuator mechanism and a connection between said automatic control and said pedal by which said pedal is effective to set aside the action of the governor when placed in a given position; a separate connection between said mechanism and said lever of said control device operative to energise said power operated mechanism when said lever is moved from a neutral toward a ratio-establishing position, and a reactive throttle controlling made concurrently effective by the power operation of said mechansim to reduce and restore the setting of said throttle during a change of clutch actuation determined by said automatic control and said pedal connection.

11. In power controls for motor vehicles, an engine, a throttle control for said engine, an accelerator pedal controlling said throttle, a power shaft and a load shaft, a variable speed transmission including forward and reverse driving elements and friction clutches for effective coupling of said shafts for drive at direct and reduction speed ratios, drive control connections for said transmission embodying a manual lever for setting initial drive thereby in forward or reverse, power-operated mechanism for actuating said clutches adapted to be automatically controlled to establish selective forward speed drive by said clutches, a control device connected to said mechanism including a governor driven by said load shaft and including a connection from said pedal effective to inhibit the action of said governor when the pedal is placed in a given position, said device providing automatic control of said mechanism, a separate connection between said device and said manual lever operative to provide a temporary power energisation of said mechanism when said lever is moved toward a drive-setting position, a neutral stop device made effective by said lever motion for preventing drive actuation by said mechanism, and a reactive control for said throttle including a member moved concurrently with the power-operated mechanism effective to set aside and restore the normal control of the throttle by the said pedal when the lever is moved toward a ratio setting position and being made inoperative when the shift motion of said lever has been completed.

12. In motor vehicle controls, an engine, an engine throttle, an engine accelerator pedal for controlling the engine throttle, a power shaft and a load shaft, a variable speed transmission adapted to couple said shafts at selected drive ratios and having drive-transmitting elements arranged to be made effective by a ratio shifter member and a master control lever, a servomotor means for actuating said shifter member, a valve-operated solenoid, a valve adapted to distribute fluid pressure for causing said servomotor means to actuate said member, a governor operating a switch adapted to energise and de-energise said solenoid in accordance with speed changes of one of said shafts, a switch adapted to energise and de-energise said solenoid in accordance with movement of said accelerator pedal, a switch adapted to control the action of said solenoid in accordance with movement of said lever, and connecting control means between said engine throttle and said member effective to reduce and to increase the setting of said throttle during the interval when said member is actuated by said servomotor means.

13. In power controls for motor vehicles equipped with engines and power transmissions coupled to the vehicle final drives, the combination of an engine driven power shaft, an engine throttle, a speed control pedal for the throttle, a load shaft, a variable speed transmission adapted to couple said shafts, a governor driven by one of said shafts, a plurality of clutches included in said transmission each when engaged coupling separate ratio drive trains while establishing the drive between the shafts, power actuated mechanism operative to establish said clutch coupling selectively, a ratio control device operated by said throttle pedal and said governor to cause said actuating means to select said coupling said device being adapted to select a higher ratio of drive in accordance with higher governor speed and a lower ratio of drive in accordance with advance of said pedal toward higher engine speed positioning of said throttle, a movable manual control operative to select initial drive by one of said clutches when starting from rest, a connecting linkage between said manual control and said device effective to render said latter means ineffective during a predetermined range of motion of said manual control during said initiation of drive by one of said clutches, and a reactive control connection operated by said power actuated mechanism to reduce the setting of said throttle against the action of said pedal and to restore same upon completion of the clutch drive establishing action of said power actuated mechanism.

14. In power controls for self-propelled vehicles, an engine driving a power shaft, a throttle for said engine, a load shaft, variable ratio drive transmitting means for connecting said shafts and embodying two clutches adapted to provide a direct, a reduced speed, and a reverse ratio drive, a forward and reverse drive selecting control for said drive transmitting means, a fluid pressure servo system including a souce of fluid pressure, a valve directing the flow of said pressure, fluid servomotor means controlled by said valve, a mechanism actuated by said fluid servomotor means and effective at end point positions to establish forward direct drive by one of said clutches, or forward reduction drive by the other of said clutches, a second fluid pressure motor means operated by the flow of pressure directed to said first motor means by said valve and effective to reduce the opening of said throttle when fluid pressure is admitted by said valve to said fluid servomotor means, and a connection made operative by said forward and reverse drive control effective during the drive selection action of said drive control to stop the motion of said mechanism in a position between said end point positions in which said clutches are inoperative to drive.

HANS O. SCHJOLIN.

REFERENCES CITED

The following references are of record in the file of this patent:

UNITED STATES PATENTS

| Number | Name | Date |
|---|---|---|
| 1,993,544 | Fleischel | Mar. 5, 1935 |
| 2,051,553 | Fleischel | Aug. 18, 1936 |
| 2,062,104 | Prince | Nov. 24, 1936 |
| 2,086,723 | Maybach | July 13, 1937 |
| 2,106,607 | Kelley | Jan. 25, 1938 |
| 2,118,978 | Maybach | May 31, 1938 |
| 2,266,598 | Hale | Dec. 16, 1941 |
| 2,322,479 | Schjolin | June 22, 1943 |

FOREIGN PATENTS

| Number | Country | Date |
|---|---|---|
| 457,269 | Great Britain | Apr. 24, 1945 |